(12) United States Patent  (10) Patent No.: US 12,198,225 B2
Bradley et al.  (45) Date of Patent: Jan. 14, 2025

(54) TRANSFORMER-BASED SHAPE MODELS (71) Applicants: DISNEY ENTERPRISES, INC., Burbank, CA (US); ETH Zürich (Eidgenössische Technische Hochschule Zürich), Zürich (CH)

(72) Inventors: Derek Edward Bradley, Zurich (CH); Prashanth Chandran, Zurich (CH); Paulo Fabiano Urnau Gotardo, Zurich (CH); Gaspard Zoss, Zurich (CH)

(73) Assignees: Disney Enterprises, INC., Burbank, CA (US); ETH Zürich (Eidgenössische Technische Hochschule Zürich), Zurich (CH)

( * ) Notice: Subject to any disclaimer, the term of this patent is extended or adjusted under 35 U.S.C. 154(b) by 281 days.

(21) Appl. No.: 17/675,713

(22) Filed: Feb. 18, 2022

(65) Prior Publication Data

US 2023/0104702 A1 Apr. 6, 2023

Related U.S. Application Data

(60) Provisional application No. 63/251,483, filed on Oct. 1, 2021.

(51) Int. Cl.
*G06K 9/00* (2022.01)
*G06N 3/045* (2023.01)
(Continued)

(52) U.S. Cl.
CPC .............. *G06T 11/00* (2013.01); *G06N 3/045* (2023.01); *G06T 7/50* (2017.01); *G06T 7/70* (2017.01);
(Continued)

(58) Field of Classification Search
CPC ....................................................... G06T 9/002
See application file for complete search history.

(56) References Cited

U.S. PATENT DOCUMENTS 6,014,146 A    1/2000   Freeman
8,370,114 B1 * 2/2013  Saisan ................... G01B 21/20
                                                              73/104

(Continued)

FOREIGN PATENT DOCUMENTS

CN         112330798 A     2/2021

OTHER PUBLICATIONS

GB Search Report for Application No. 2214447.1 dated Mar. 24, 2023.
(Continued)

*Primary Examiner* — Hadi Akhavannik
(74) *Attorney, Agent, or Firm* — Squire Patton Boggs LLP; Sarah Mirza (57) ABSTRACT

A technique for synthesizing a shape includes generating a first plurality of offset tokens based on a first shape code and a first plurality of position tokens, wherein the first shape code represents a variation of a canonical shape, and wherein the first plurality of position tokens represent a first plurality of positions on the canonical shape. The technique also includes generating a first plurality of offsets associated with the first plurality of positions on the canonical shape based on the first plurality of offset tokens. The technique further includes generating the shape based on the first plurality of offsets and the first plurality of positions.

20 Claims, 6 Drawing Sheets

(51) Int. Cl.
  *G06T 7/50* (2017.01)
  *G06T 7/70* (2017.01)
  *G06T 11/00* (2006.01)
(52) U.S. Cl.
  CPC ............... *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 10,885,707 | B1 | 1/2021 | Fu et al. |
| 11,222,466 | B1* | 1/2022 | Naruniec ............... G06N 3/088 |
| 2018/0131554 | A1* | 5/2018 | Liu ........................ H04L 27/362 |
| 2018/0183650 | A1* | 6/2018 | Zhang .................. H04W 72/21 |
| 2019/0251612 | A1* | 8/2019 | Fang .................... G06Q 30/0643 |
| 2019/0362529 | A1* | 11/2019 | Wedig ..................... G06T 13/40 |
| 2020/0120340 | A1* | 4/2020 | Park ........................ H04N 19/65 |
| 2020/0151952 | A1* | 5/2020 | Aksit ..................... G06N 3/045 |
| 2020/0202622 | A1* | 6/2020 | Gallo ....................... G06T 15/10 |
| 2021/0065418 | A1* | 3/2021 | Han ........................ G06T 11/60 |
| 2022/0391611 | A1* | 12/2022 | Kalarot .................... G06N 3/09 |
| 2023/0316587 | A1* | 10/2023 | Ghebremusse ...... G06V 10/454 345/619 |

OTHER PUBLICATIONS

Abrevaya et al., "A Decoupled 3D Facial Shape Model by Adversarial Training", IEEE International Conference on Computer Vision (ICCV), arXiv:1902.03619, 2019, 17 pages.
Bouritsas et al., "Neural 3D Morphable Models: Spiral Convolutional Networks for 3D Shape Representation Learning and Generation", IEEE International Conference on Computer Vision (ICCV), 2019, pp. 7212-7221.
Beeler et al., "High-Quality Passive Facial Performance Capture using Anchor Frames", ACM Transactions on Graphics, vol. 30, No. 4, Article 75, Jul. 2011, pp. 75:1-75:10.
Bogo et al., "Dynamic FAUST: Registering Human Bodies in Motion", In IEEE Computer Vision and Patter Recognition (CVPR), 2017, 10 pages.
Blanz et al., "A Morphable Model for the Synthesis of 3D Faces", SIGGRAPH, vol. 99, 1999, pp. 187-194.
Chandran et al., "Semantic Deep Face Models", In International Conference on 3D Vision, 2020, 10 pages.
Chen et al., "Learning Feature Aggregation for Deep 3D Morphable Models", IEEE Computer Vision and Pattern Recognition (CVPR), 2021, pp. 13164-13173.
Dosovitskiy et al., "An image is worth 16×16 words: Transformers for image recognition at scale", ICLR, arXiv:2010.11929, 2021, 22 pages.
Defferrard et al., "Convolutional Neural Networks on Graphs with Fast Localized Spectral Filtering", Advances in Neural Information Processing Systems, arXiv:1606.09375, 2016, 9 pages.
Devlin et al., "Bert: Pre-training of deep bidirectional transformers for language understanding", Proceedings of NAACL-HLT, 2019, pp. 4171-4186.
El-Nouby et al., "XCiT: Cross-Covariance Image Transformers", arXiv:2106.09681, 2021, 18 pages.
Egger et al., "3D Morphable Face Models—Past, Present, and Future", ACM Transactions on Graphics, vol. 39, No. 5, Article 157, Jun. 2020, pp. 157:1-157:38.
Gong et al., "SpiralNet++: A Fast and Highly Efficient Mesh Convolution Operator", IEEE International Conference on Computer Vision (ICCV)Workshops, arXiv:1911.05856, 2019, 8 pages.
Hanocka et al., "MeshCNN: A Network with an Edge", ACM Transactions on Graphics, vol. 38, No. 4, https://doi.org/10.1145/3306346.3322959, Article 90, Jul. 2019, pp. 90:1-90:12.
Kavan et al., "Geometric Skinning with Approximate Dual Quaternion Blending", ACM Transactions on Graphics, vol. 27, No. 4, Article 105, Oct. 2008, pp. 105:1-105:23.
Kavan et al., "Spherical Blend Skinning: A Real-time Deformation of Articulated Models", Proceedings of the 2005 Symposium on Interactive 3D Graphics and Games, Association for Computing Machinery, 2009, pp. 9-16.
Loper et al., "SMPL: A Skinned Multi-Person Linear Model", ACM Transactions on Graphics, vol. 34, No. 6, Article 248, Nov. 2015, pp. 248:1-248:16.
Lin et al., "End-to-End Human Pose and Mesh Reconstruction with Transformers", IEEE Computer Vision and Pattern Recognition (CVPR), 2021, pp. 1954-1963.
Lin et al., "Mesh Graphormer", IEEE International Conference on Computer Vision (ICCV), arXiv:2104.00272, 2021, 15 pages.
Neumann et al., "Sparse Localized Deformation Components", ACM Transactions on Graphics, vol. 32, No. 6, Article 179, Nov. 2013, pp. 179:1-179:10.
Ranjan et al., "Generating 3D faces using Convolutional Mesh Autoencoders", European Conference on Computer Vision (ECCV), arXiv:1807.10267, 2018, 21 pages.
Romero et al., "Embodied Hands: Modeling and Capturing Hands and Bodies Together", ACM Transactions on Graphics, vol. 36, No. 6, Article 245, Nov. 2017, pp. 245:1-245:17.
Tena et al., "Interactive Region-Based Linear 3D Face Models", ACM Transactions on Graphics, vol. 30, No. 4, Article 76, Jul. 2011, pp. 76:1-76:10.
Vlasic et al., "Face Transfer with Multilinear Models", ACM Transactions on Graphics, SIGGRAPH, 2005, 8 pages.
Vaswani et al., "Attention Is All You Need", Advances in Neural Information Processing Systems, arXiv:1706.03762, 2017, 15 pages.
Wu et al., "An Anatomically-Constrained Local Deformation Model for Monocular Face Capture", ACM Transactions on Graphics, vol. 35, No. 4, Article 115, Jul. 2016, pp. 115:1-115:12.
Wang et al., "Facial Expression Synthesis using a Global-Local Multilinear Framework", Computer Graphics Forum, vol. 39, No. 2, DOI: 10.1111/cgf.13926, 2020, pp. 235-245.
Zhou et al., "Fully Convolutional Mesh Autoencoder using Efficient Spatially Varying Kernels", Advances in Neural Information Processing Systems, arXiv:2006.04325, 2020, 14 pages.
New Zealand Patent Examination Report 1, Application Serial No. 792856, dated Mar. 28, 2024, 3 pages.
Office Action dated Mar. 18, 2024, for Canadian Patent Application No. 3,177,593, 6 pages.

* cited by examiner

TRANSFORMER-BASED SHAPE MODELS

CROSS-REFERENCE TO RELATED APPLICATIONS

This application claims benefit of U.S. Provisional Patent Application titled "TOPOLOGY-INDEPENDENT 3D FACE MODELS USING TRANSFORMER NETWORKS," filed Oct. 1, 2021 and having Ser. No. 63/251,483. The subject matter of this related application is hereby incorporated herein by reference.

BACKGROUND

Field of the Various Embodiments

Embodiments of the present disclosure relate generally to machine learning and computer vision and, more specifically, to transformer-based shape models.

Description of the Related Art

Realistic digital representations of faces, hands, bodies, and other recognizable objects are required for various computer graphics and computer vision applications. For example, digital representations of real-world deformable objects are oftentimes used in virtual scenes of film or television productions and in video games.

One technique for representing a digital shape involves using a data-driven parametric shape model to characterize realistic variations in the appearance of the shape. The data-driven parametric shape model is typically built from a dataset of scans of the same type of shape and represents a new shape as a combination of existing shapes in the dataset.

One common parametric shape model includes a linear three-dimensional (3D) morphable model that expresses new faces, bodies, and/or other shapes as linear combinations of prototypical basis shapes from a dataset. However, the linear 3D morphable model is unable to represent continuous, nonlinear deformations that are common to faces and other recognizable shapes. At the same time, linear combinations of input shapes generated by the linear 3D morphable model can lead to unrealistic motion or physically impossible shapes. Thus, when the linear 3D morphable model is used to represent faces (for example), the linear 3D morphable model is unable to represent all possible face shapes and is also capable of representing many non-face shapes.

More recently, machine learning techniques have been developed that enable representing shapes as nonlinear deformations of other shapes. However, these machine learning techniques present a number of drawbacks. For example, in some techniques a fully connected neural network can be used to learn a "global" model of the shape of an object. However, this type of fully connected neural network includes a large number of tunable parameters and thus requires a large and varied training dataset for training. Additionally, the fully connected neural network can model spurious global correlations between distant points across the object and generalizes poorly to data outside of the training dataset.

In other techniques, a convolutional neural network (CNN) can be used to perform convolutions on a two-dimensional (2D) image grid or on a 3D point neighborhood along the surface of a 3D mesh, which allows the CNN to learn localized models of surface deformations on an object. However, the ability of the CNN to capture global correlations is limited, and handcrafted precomputation of upsampling and downsampling operations is required to adapt the CNN to different 3D mesh topologies.

As the foregoing illustrates, what is needed in the art are more effective techniques for generating parametric shape models.

SUMMARY

A technique for synthesizing a shape includes generating a first plurality of offset tokens based on a first shape code and a first plurality of position tokens, wherein the first shape code represents a variation of a canonical shape, and wherein the first plurality of position tokens represent a first plurality of positions on the canonical shape. The technique also includes generating a first plurality of offsets associated with the first plurality of positions on the canonical shape based on the first plurality of offset tokens. The technique further includes generating the shape based on the first plurality of offsets and the first plurality of positions.

One technical advantage of the disclosed techniques relative to the prior art is the ability to learn both global and local correlations across points on a shape. Accordingly, the disclosed techniques generate more accurate or realistic shapes than conventional approaches that focus on either global or local spatial correlations in modeling shapes. Another technical advantage of the disclosed techniques is that geometric shape detail can be represented in a topology-independent manner with arbitrary spatial resolution. Consequently, the disclosed techniques do not require handcrafted precomputation of upsampling and downsampling operations to adapt a parametric shape model to different topologies. Further, the disclosed techniques can be used with multiple mesh topologies and resolutions, both during training and shape synthesis. These technical advantages provide one or more technological improvements over prior art approaches.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
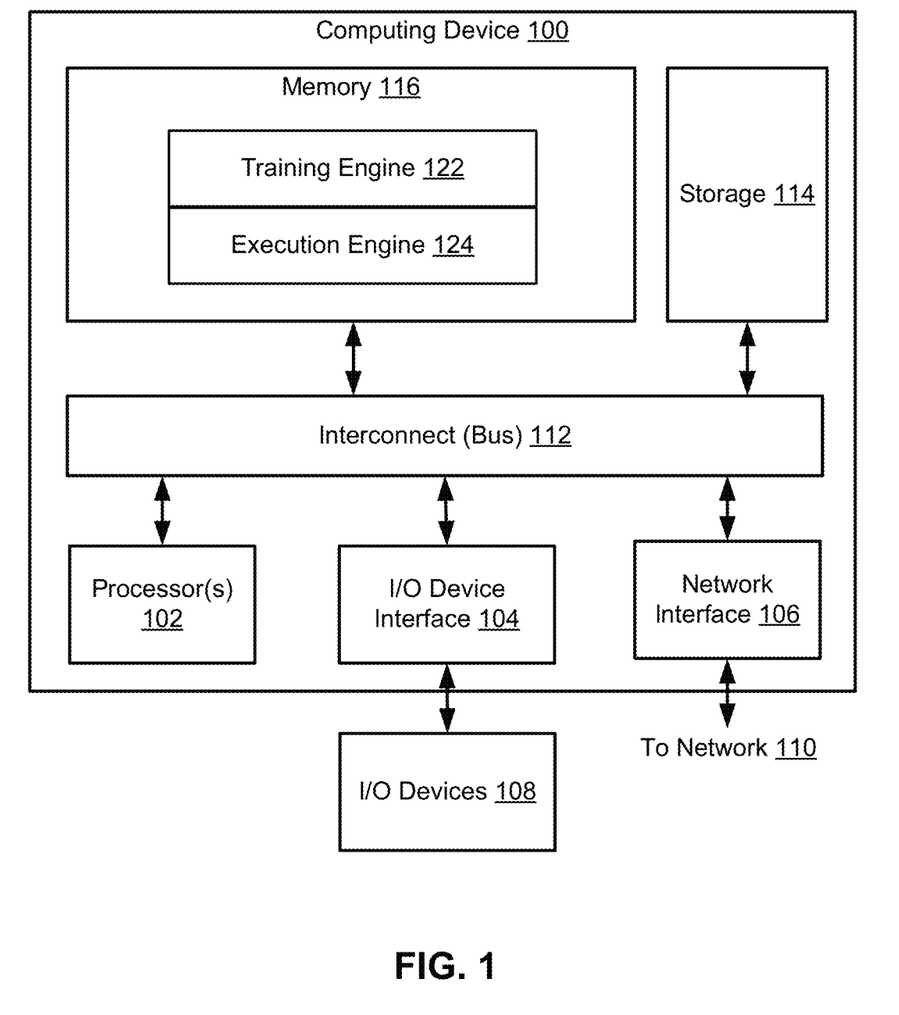
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains a machine learning model to learn nonlinear global (e.g., across an entire shape) and local (e.g., in the vicinity of a point or region within a shape) correlations across points or regions in faces, hands, bodies, and/or other three-dimensional (3D) shapes. Execution engine 124 executes one or more portions of the machine learning model to generate and/or reconstruct additional shapes. More specifically, the machine learning model includes a transformer-based neural network that can represent geometric shape detail in a topology-independent manner with arbitrary spatial resolution. Consequently, the machine learning model can be used in various applications related to generating, interpolating, and/or reconstructing various shapes, as described in further detail below.

Transformer-Based Topology Independent Shape Model

Figure 2:
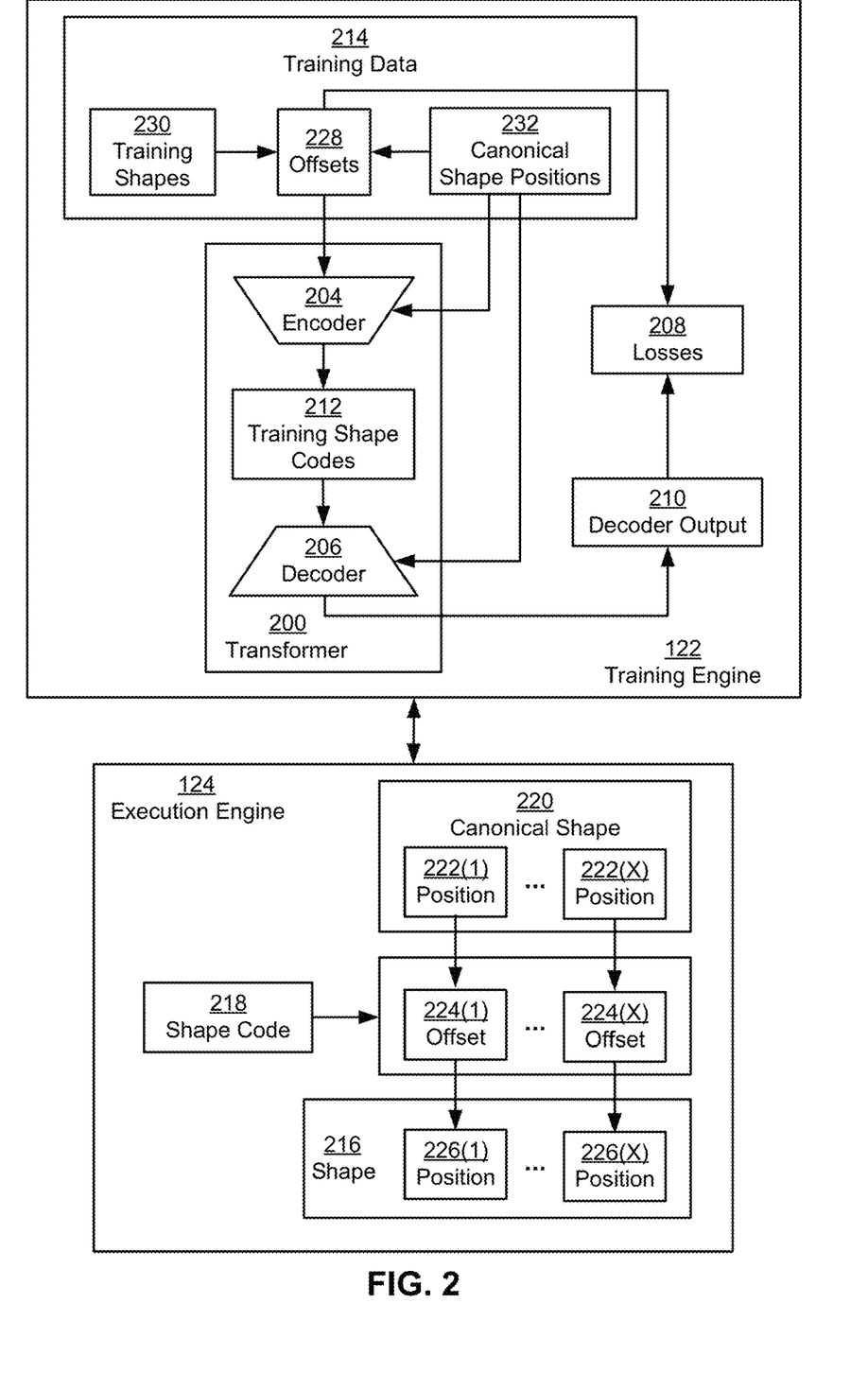
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a transformer 200 that represents a domain of statistically plausible 3D shapes in a nonlinear manner. For example, training engine 122 and execution engine 124 could use transformer 200 to represent statistically plausible variations on human or animal faces, bodies, and/or body parts. In another example, training engine 122 and execution engine 124 could use transformer 200 to represent different expressions, postures, or deformations associated with a face, body, body part, or another type of object with a specific identity (e.g., a specific person or animal).

As shown in FIG. 2, transformer 200 represents a given 3D shape as a set of offsets 224(1)-224(X) from a set of positions 222(1)-222(X) on a canonical shape 220, where X represents an integer greater than one. Canonical shape 220 represents a "template" from which all other shapes are defined. For example, canonical shape 220 could include a "standard" or "neutral" face, hand, body, or other deformable object. This "standard" or "neutral" representation of the object can be generated by averaging or otherwise aggregating the points across multiple (e.g., hundreds or thousands) of different versions of the object. If transformer 200 is used to represent expressions or deformations of an object associated with a specific identity (e.g., a specific person's face), canonical shape 220 could represent the object in a "neutral" or "default" expression or posture.

In one or more embodiments, canonical shape 220 is defined as a continuous surface in two-dimensional (2D) or 3D space. Each of positions 222(1)-222(X) (which is referred to individually as position 222) can then be sampled from the continuous surface. For example, canonical shape 220 could be specified as a manifold representing a face, hand, body, or another deformable object. As a result, positions 222 could be determined by sampling points from the manifold. After a given position 222 on the manifold is determined (e.g., as a set of 3D coordinates), the position could be stored for subsequent retrieval and use with transformer 200.

Canonical shape 220 may also, or instead, include a "densest" mesh that includes all possible positions 222 that can be sampled or selected. For example, canonical shape 220 could include hundreds of thousands to millions of points in an "average" or "standard" representation of a face, hand, body, or another object. Positions 222 from which other shapes are defined could include some or all of these points in canonical shape 220.

Each of offsets 224(1)-224(X) (which is referred to individually as offset 224) represents a shift in a corresponding position 222 in canonical shape 220. This shift corresponds to a geometric deformation of canonical shape 220 into a different shape. For example, offsets 224 could be added to the corresponding positions 222 in canonical shape 220 to produce an output shape 216 that represents a specific identity, expression, or posture exhibited by a face, body, body part, or another object represented by canonical shape 220.

As shown in FIG. 2, transformer 200 includes an encoder 204 and a decoder 206. In various embodiments, encoder 204 and decoder 206 are implemented as neural networks. Input into encoder 204 includes canonical shape positions 232 in canonical shape 220, as well as offsets 228 between canonical shape positions 232 and corresponding points in a set of target shapes (e.g., one or more training shapes 230). For example, canonical shape positions 232 could include locations or coordinates of points in canonical shape 220, and offsets 228 could include differences between the locations or coordinates of points in canonical shape 220 and the locations or coordinates of corresponding points in the target shapes. For a given set of canonical shape positions 232 and a corresponding set of offsets 228 that represent a target shape, encoder 204 generates a shape code 218 that represents the target shape as a variation of canonical shape 220.

Input into decoder 206 includes a given shape code 218 that is generated by encoder 204, interpolated from two or more other shape codes, and/or randomly generated. For example, shape code 218 could include a Y-dimensional vector (where Y is an integer greater or equal to 1) that is generated by encoder 204 from a training shape. In another example, shape code 218 could be calculated as a Y-dimensional vector that lies along a line between two other Y-dimensional vectors that are generated by encoder 204 from two training shapes 230. In a third example, shape code 218 could include a Y-dimensional vector, where each element in the vector is sampled from a distribution or range of values for that element outputted by encoder 204 from a set of training shapes 230. Input into decoder 206 also includes a set of positions 222 in canonical shape 220, which can be the same as or different from canonical shape positions 232 inputted into encoder 204. For each position 222 in canonical shape 220 inputted into decoder 206, decoder 206 generates a corresponding offset 224 that denotes a shift in that position 222. Offsets 224 outputted by decoder 206 are combined with the corresponding positions 222 in canonical shape 220 to produce a new set of positions 226(1)-226(X) (each of which is referred to individually as position 226) in a different shape 216.

Figure 3:
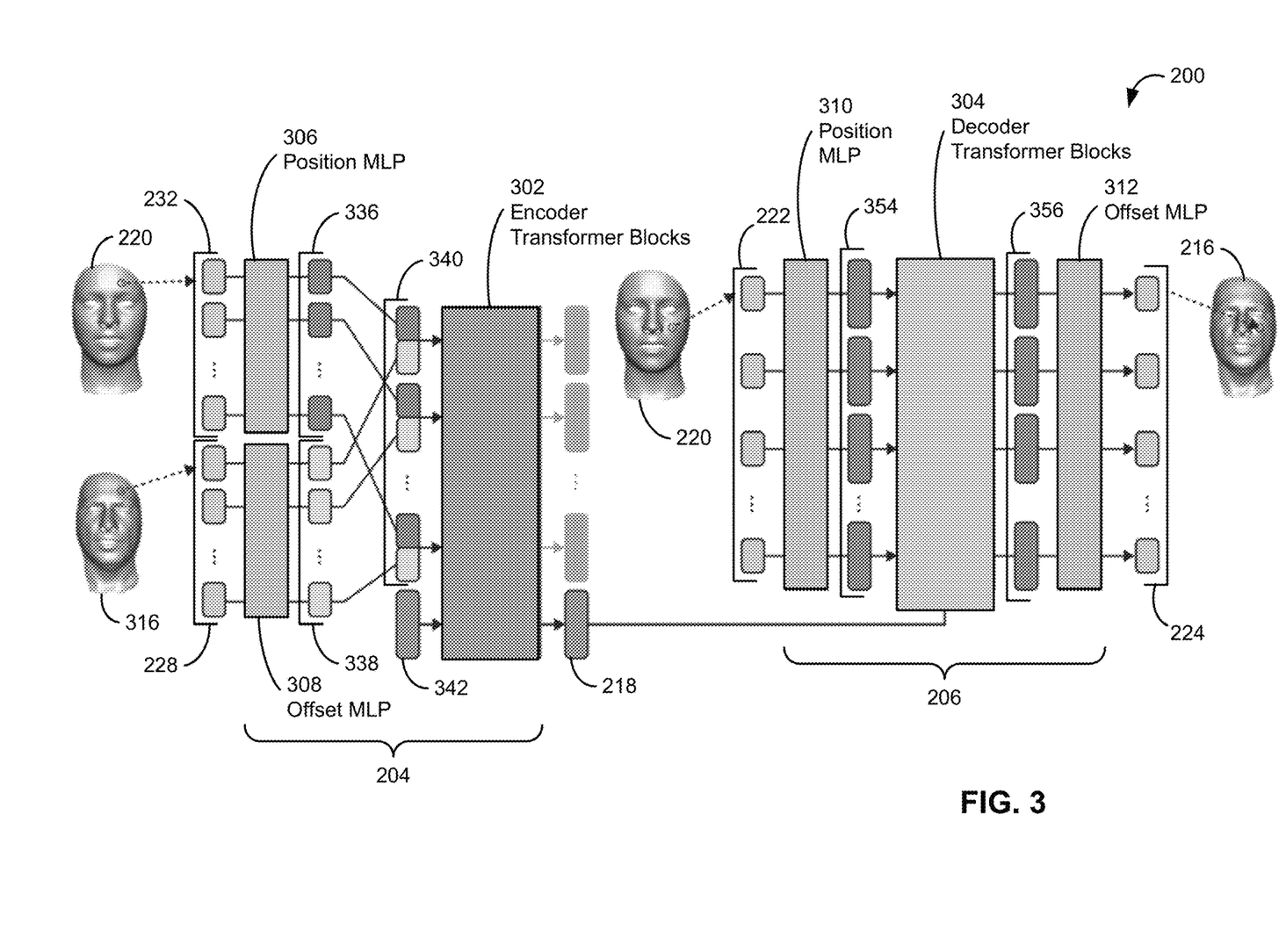
FIG. 3 illustrates an exemplar architecture for the transformer of FIG. 2, according to various embodiments.

FIG. 3 illustrates an exemplar architecture for transformer 200 of FIG. 2, according to various embodiments. As shown in FIG. 3, encoder 204 includes a position multi-layer perceptron (MLP) 306, an offset MLP 308, and a number of encoder transformer blocks 302. Decoder 206 includes a position MLP 310, an offset MLP 312, and a number of decoder transformer blocks 304. Each of these components is described in further detail below.

Position MLP 306 in encoder 204 converts a set of canonical shape positions 232 in canonical shape 220 into a corresponding set of position tokens 336. For example, position MLP 306 could include a series of fully connected layers that map each of canonical shape positions 232 in canonical shape 220 to a higher-dimensional position token in a latent space.

Offset MLP 308 converts a set of offsets 228 associated with canonical shape positions 232 in canonical shape 220 into a corresponding set of offset tokens 338. For example, offset MLP 308 could include a series of fully connected layers that map each of offsets 228 to a higher-dimensional offset token in a latent space. Each of offsets 228 represents a displacement or shift in a corresponding canonical shape position in canonical shape 220 that results in a new position on a target shape 316. Thus, if input into encoder 204 includes M (where M is an integer greater than or equal to 1) canonical shape positions 232 on canonical shape 220 and M corresponding offsets 228 representing target shape 316, position MLP 306 generates M position tokens 336 from the M canonical shape positions 232, and offset MLP 308 generates M offset tokens 338 from the M offsets 228. This conversion of canonical shape positions 232 and offsets 228 into position tokens 336 and offset tokens 338, respectively, allows transformer 200 to distribute representations of canonical shape positions 232 and offsets 228 in a way that optimizes for the shape modeling task.

Position tokens 336 are concatenated with the corresponding offset tokens 338 to form a set of concatenated tokens 340. Concatenated tokens 340 represent a "tagging" of each offset token with features related to a corresponding position in canonical shape 220. These "tagged" offset tokens 338 can be used by other components of transformer 200 to learn both local and global spatial correlations across variations in canonical shape 220, as represented by target shape 316.

Concatenated tokens 340 and a shape token 342 are inputted into a series of encoder transformer blocks 302 with the same structure and different weights. For example, concatenated tokens 340 and shape token 342 could be processed sequentially by a "stack" of N (where N is an integer greater than or equal to 1) encoder transformer blocks 302, so that the output of a given encoder transformer block is used as input into the next encoder transformer block. Each encoder transformer block includes a cross-covariance image transformer (XCiT) block with a cross-covariance attention (XCA) layer, a transformer block with a self-attention layer, and/or another type of transformer neural network architecture. The output of the last encoder transformer block includes shape code 218, which captures the differences between canonical shape 220 and target shape 316 in a manner that is independent of the topology associated with canonical shape positions 232 and offsets 228.

In one or more embodiments, shape token 342 is an "extra" input token that represents all input target shapes into encoder 204. During training of transformer 200, shape token 342 is updated along with parameters of transformer 200. Unlike concatenated tokens 340, shape token 342 is not position encoded. Instead, encoder transformer blocks 302 embed shape token 342 with information from concatenated tokens 340 to produce a corresponding output shape code 218. Because shape token 342 is able to represent positional differences between canonical shape 220 and a corresponding target shape 316, other tokens outputted by encoder transformer blocks 302 from the corresponding concatenated tokens 340 can be discarded.

Within decoder 206, position MLP 310 converts a second set of positions 222 in canonical shape 220 into a corresponding set of position tokens 354. For example, position MLP 310 could include a series of fully connected layers that map each position to a higher-dimensional position token in a latent space. Position MLP 310 could include the same structure and weights as position MLP 306, or position MLP 310 could differ in structure and/or weights from position MLP 306. Further, positions 222 inputted into position MLP 310 of decoder 206 are not required to match canonical shape positions 232 inputted into position MLP 306 of encoder 204.

Position tokens 354 are inputted into a series of decoder transformer blocks 304 with the same structure and different weights. For example, position tokens 354 could be processed sequentially by a "stack" of O (where O is an integer greater than or equal to 1) decoder transformer blocks 304, so that the output of a given decoder transformer block is used as input into the next decoder transformer block. As with encoder transformer blocks 302, each of decoder transformer blocks 304 includes a cross-covariance image transformer (XCiT) block with a cross-covariance attention (XCA) layer, a transformer block with a self-attention layer, and/or another type of transformer neural network architecture. Each of decoder transformer blocks 304 also uses shape code 218 to modulate position tokens 354 and/or a set of tokens from the previous decoder transformer block. The output of the last decoder transformer block includes a set of offset tokens 356, one for each position token inputted into decoder transformer blocks 304. Decoder transformer blocks 304 are described in further detail below with respect to FIGS. 4A-4B.

Offset tokens 356 outputted by decoder transformer blocks 304 are inputted into an offset MLP 312 to generate a set of offsets 224 that represent an output shape 216. These offsets 224 can be added to (or otherwise combined with) the corresponding positions 222 on canonical shape 220 to produce positions 226 in the output shape 216.

Returning to the discussion of FIG. 2, training engine 122 trains transformer 200 using training data 214 that includes a set of training shapes 230. In one or more embodiments, each of training shapes 230 includes a mesh, point cloud, or another representation of a set of points with known spatial correspondence. For example, training shapes 230 could include high-resolution 3D scans, motion capture data, and/or other point-based representations of faces, hands, bodies, and/or other objects. Points in training shapes 230 can vary in topology and/or spatial resolution. Points in training shapes 230 can also be averaged or otherwise combined into canonical shape 220.

Training engine 122 computes offsets 228 between points in training shapes 230 and the corresponding canonical shape positions 232 in canonical shape 220. Next, training engine 122 inputs offsets 228 and canonical shape positions 232 into encoder 204 to generate a set of training shape codes 212 representing training shapes 230. Training engine 122 inputs training shape codes 212 and the same canonical shape positions 232 into decoder 206 to generate decoder output 210 that includes offsets 224 from canonical shape positions 232. Training engine 122 also performs supervised training that jointly optimizes the weights of encoder 204 and decoder 206 and shape token 342 based on one or more losses 208 between decoder output 210 and offsets 228 of the corresponding training shapes 230. For example, training engine 122 could calculate an L2 loss between offset values in decoder output 210 and the corresponding ground truth offsets 228. Training engine 122 also uses a training technique (e.g., gradient descent and backpropagation) to iteratively update weights of encoder 204 and decoder 206 in a way that reduces subsequent losses 208 between offsets 228 calculated from training shapes 230 in training data 214 and the corresponding decoder output 210.

In some embodiments, training engine 122 creates and/or trains transformer 200 according to one or more hyperparameters. In some embodiments, hyperparameters define higher-level properties of transformer 200 and/or are used to control the training of transformer 200. For example, hyperparameters that affect the structure of transformer 200 could include (but are not limited to) the number of encoder transformer blocks 302 in encoder 204 and/or the number of decoder transformer blocks 304 in decoder 206; the number of layers in position MLP 306, offset MLP 308, position MLP 310, and/or offset MLP 312; the dimensionality of the feed-forward layers in encoder transformer blocks 302, decoder transformer blocks 304, position MLP 306, offset MLP 308, position MLP 310, and/or offset MLP 312; and/or the dimensionality of position tokens 336, offset tokens 338, shape token 342, shape code 218, position tokens 354, and/or offset tokens 356. In another example, training engine 122 could train transformer 200 based on a batch size, learning rate, number of iterations, and/or another hyperparameter that controls the way in which weights in transformer 200 are updated during training.

After training engine 122 has completed training of transformer 200, execution engine 124 can execute the trained transformer 200 to produce a new shape 216 from a given shape code 218 and a set of positions 222 in canonical shape 220. For example, execution engine 124 could obtain a specific shape code 218 generated by the trained encoder 204 from a training shape in training data 214, generate shape code 218 by interpolating between two or more shape codes generated from two or more training shapes 230, and/or randomly generate shape code 218. Next, execution engine 124 could input shape code 218 and an arbitrary set of positions 222 from canonical shape 220 into decoder 206 and obtain, as output of decoder 206, offsets 224 from positions 222 that represent shape 216. Execution engine 124 adds and/or otherwise combines offsets 224 with the corresponding positions 222 in canonical shape 220 to produce a set of positions 226 in shape 216.

In one or more embodiments, training engine 122 and/or execution engine 124 use transformer 200 in a variety of applications related to topology-independent 3D shape modeling, reconstruction, shape deformation, and/or other operations related to the domain of shapes learned by transformer 200. First, decoder 206 can be used to synthesize new shapes (e.g., shape 216) that are not in training data 214 based on shape codes that are not generated from training shapes 230 in training data 214. When a given shape code 218 is interpolated from or lies between or among two or more shape codes generated from training shapes 230, the resulting output shape 216 includes identity, pose, expression, and/or other visual attributes that are "in between" those training shapes 230.

Second, decoder 206 can be used to generate new shapes based on offsets 224 from an arbitrary set of positions 222 in canonical shape 220. These positions 222 can include points that are not included in canonical shape positions 232 within training data 214, positions 222 that are near and/or far from one another, positions 222 with arbitrary spatial resolution, and/or positions 222 in an arbitrary ordering. For example, transformer 200 could be trained on canonical shape positions 232 with a certain topology and spatial resolution. Transformer 200 could be used to generate new shapes with higher spatial resolutions (e.g., double or quadruple the spatial resolution associated with canonical shape positions 232 in training data 214) without retraining on the higher spatial resolutions. Additionally, transformer 200 would be able to perform super-resolution or upsampling that increases surface details in a given output shape 216 (e.g., wrinkles in the palm of a hand or a face) when positions 222 used to generate shape 216 have a higher resolution than canonical shape positions 232 in training data 214.

Third, transformer 200 can be used to "complete" a shape when regions or portions of the shape are missing or occluded. For example, canonical shape positions 232 and offsets 228 associated with a partial shape (e.g., a mesh of a face with vertices missing from the cheek, chin, upper lip, nose, and/or another region) could be inputted into encoder 204 to generate a corresponding shape code 218. Shape code 218 and positions 222 representing the full shape (e.g., vertices representing a mesh of an entire face) could be inputted into decoder 206 to generate plausible offsets 224 and corresponding positions 226 for the entire shape 216. In another example, transformer 200 could be trained to model deformations or variations on a specific shape (e.g., an actor's face). The trained encoder 204 could be used to convert a small number of canonical shape positions 232 and corresponding offsets 228 on the shape (e.g., dozens of landmarks detected using a landmark detection technique or 100-200 markers from a motion capture technique) into shape code 218. The trained decoder 206 could be used to generate a reconstruction of the corresponding shape 216 that includes a much larger number of positions 226 (e.g., thousands to tens of thousands of vertices) on an output shape 216. The output shape 216 thus includes canonical shape positions 232 used to generate shape code 218, as well as additional positions 226 that are determined based on learned correlations with canonical shape positions 232.

Fourth, transformer 200 can be trained on training shapes 230 obtained via high resolution input scans. The trained transformer 200 can be used to generate new shapes with the same level of detail. For example, a set of training shapes 230 could include dozens of facial scans of a single face. Each scan could include hundreds of thousands of vertices capturing detail that includes skin pores and fine wrinkling. Around one million weights in transformer 200 could be used to represent tens of millions of vertices in the set of training shapes 230. A high-quality facial animation of the same person could be produced by interpolating between or across shape codes produced by the trained encoder 204 from training shapes 230. To accommodate memory limitations, encoder 204 could encode a fixed set of tens of thousands of canonical shape positions 232 and corresponding offsets 228 for each of training shapes 230. The tens of thousands of points could be randomly sampled during training to cover the entire face. The corresponding shape codes could then be inputted with tens of thousands of other randomly sampled positions 222 into decoder 206 to reconstruct the corresponding offsets 224. This random sampling of positions 222 with the same shape code could additionally be repeated to gradually increase the resolution of the corresponding output shape 216. Further, this trained transformer 200 could be used with positions 222 associated with different topologies and spatial resolutions to tailor the output shape 216 to different applications.

Fifth, a trained transformer 200 can be fit to a new output shape 216 by iteratively optimizing for a corresponding shape code 218 that minimizes a loss (e.g., losses 208) between a set of points on a target shape and a corresponding set of positions 226 on the output shape 216. For example, gradient descent could be used to iteratively update shape code 218 in a way that reduces an L2 loss between a previously unseen target shape and positions 226 on the output shape 216 produced by decoder 206 from shape code 218. The resulting shape code 218 can then be used to initialize a subsequent optimization step that further refines the output shape 216. This type of optimization can also be used to compute different shape codes for different regions of the target shape, which can further improve the quality of fit and expressibility of shape 216.

Sixth, the output shape 216 can be varied by inputting different shape codes into different decoder transformer blocks 304. For example, decoder 206 could include a series of four decoder transformer blocks 304. Each decoder transformer block uses a corresponding shape code 218 to modulate a set of input tokens representing a set of positions 222 on canonical shape 220. As a result, the output of decoder 206 could be varied by "mixing and matching" up to four different shape codes as input into the four corresponding decoder transformer blocks 304. Each permutation of the shape codes inputted into decoder transformer blocks 304 would result in a different output shape 216.

Seventh, transformer 200 can be constructed and/or trained in a way that disentangles canonical shape 220 deformations caused by identity changes from canonical shape 220 deformations caused by expression changes. In particular, shape code 218 can be split into an "identity" code representing an identity of a subject (e.g., a specific person) and an "expression" code representing an expression (e.g., a specific facial expression), as described in further detail below with respect to FIG. 4B. During training, the identity code is constrained to be the same for all expressions of the same subject, while the expression code is varied for each individual expression. The identity and expression codes can additionally be modulated separately to produce corresponding variations in the output shape 216. For example, the identity associated with shape 216 could be varied (including generating new identities not associated with training shapes 230) by changing (e.g., randomly sampling, interpolating, etc.) the identity code and fixing the expression code. Conversely, the expression associated with shape 216 could be varied (including generating new expressions not associated with training shapes 230) by changing (e.g., randomly sampling, interpolating, etc.) the expression code and fixing the identity code. Different identity and/or expression codes can also be applied to different regions of a given output shape 216. For example, different identity and/or expression codes can be used with positions 222 on different sides or regions of a face to generate an output shape 216 that reflects a combination of the corresponding identities and/or expressions.

Figure 4A:
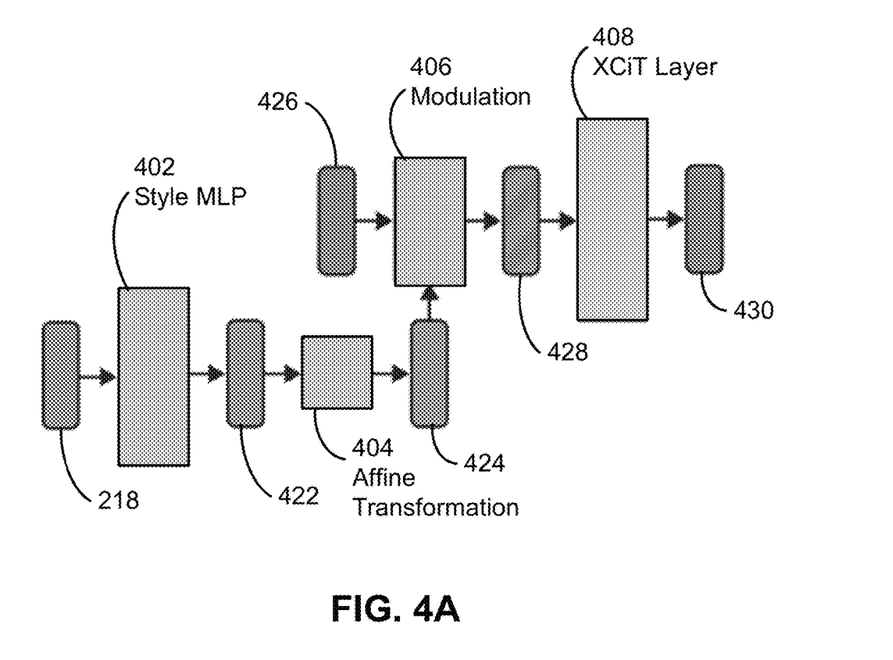
FIG. 4A is a more detailed illustration of a decoder transformer block in the transformer of FIG. 2, according to various embodiments.

FIG. 4A is a more detailed illustration of a decoder transformer block in transformer 200 of FIG. 2, according to various embodiments. As shown in FIG. 4A, input into the decoder transformer block includes an input token 426 and shape code 218. Input token 426 can include a position token (e.g., position tokens 354) outputted by position MLP 310 in decoder 206, or input token 426 can be a token outputted by a previous decoder transformer block in decoder 206.

A style MLP 402 in the decoder transformer block converts shape code 218 into an output code 422. For example, style MLP 402 could include multiple fully connected layers with nonlinear activations. An affine transformation 404 is then applied to code 422 to produce a token 424 that is the same size as token 426.

A modulation 406 is then applied to both token 424 and token 426 to produce a styled token 428. For example, modulation 406 could include a pointwise multiplication that "infuses" information about the shape represented by shape code 218 into token 426 representing a position on canonical shape 220. Because a separate styled token 428 is produced for each position token, each styled token 428 could be produced as a modulation of a corresponding input token 426 with a potentially different shape code 218. This separate modulation of input tokens 426 with multiple shape codes allows for additional localized shape deformation, in addition to or in lieu of the techniques described above.

After styled token 428 is generated for each position token, the set of styled tokens representing all input positions 222 in canonical shape 220 is fed into an XCiT layer 408. XCiT layer 408 processes each individual styled token 428 and exchanges information across the set of styled tokens via cross-covariance attention. The output of XCiT layer 408 includes a separate output token 430 for each styled token 428. This output token 430 can then be inputted into the next decoder transformer block in decoder 206. If output token 430 is produced by the last decoder transformer block in decoder 206, output token 430 is inputted into offset MLP 312 to generate an offset (e.g., offsets 224) from the corresponding position in canonical shape 220. The set of offsets 224 outputted by offset MLP 312 from all output tokens 430 is then applied to the corresponding positions 222 in canonical shape 220 to produce the output shape 216.

Figure 4B:
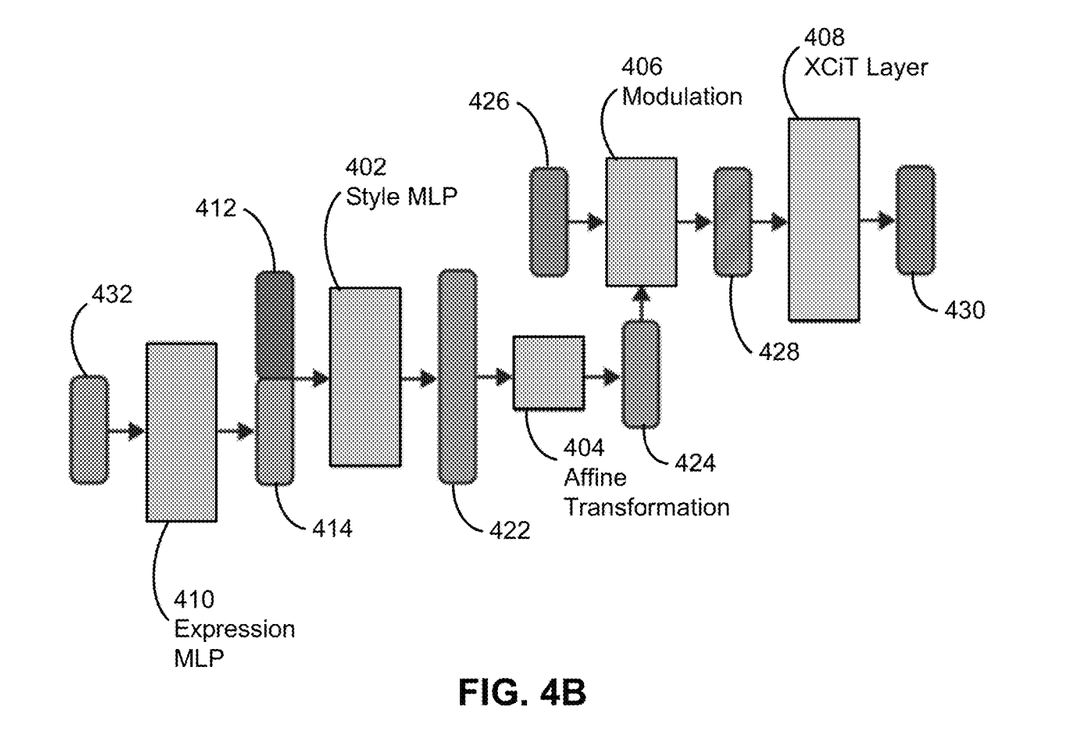
FIG. 4B is a more detailed illustration of a decoder transformer block in the transformer of FIG. 2, according to various embodiments.

FIG. 4B is a more detailed illustration of a decoder transformer block in transformer 200 of FIG. 2, according to various embodiments. More specifically, FIG. 4B shows a variation on the decoder transformer block, in which shape code 218 is represented as a combination of an identity code 412 and an expression code 414.

As shown in FIG. 4B, a set of expression blendweights 432 (or another representation of a facial or another type of expression) is inputted into an expression MLP 410 to generate expression code 414. For example, expression MLP 410 could include multiple fully connected layers with nonlinear activations that convert expression blendweights 432 into expression code 414. Expression code 414 is concatenated with identity code 412 to form shape code 218. Shape code 218 and input token 426 are then processed by neural network layers implementing style MLP 402, affine transformation 404, modulation 406, and XCiT layer 408 in the manner described above with respect to FIG. 4A.

Figure 5:
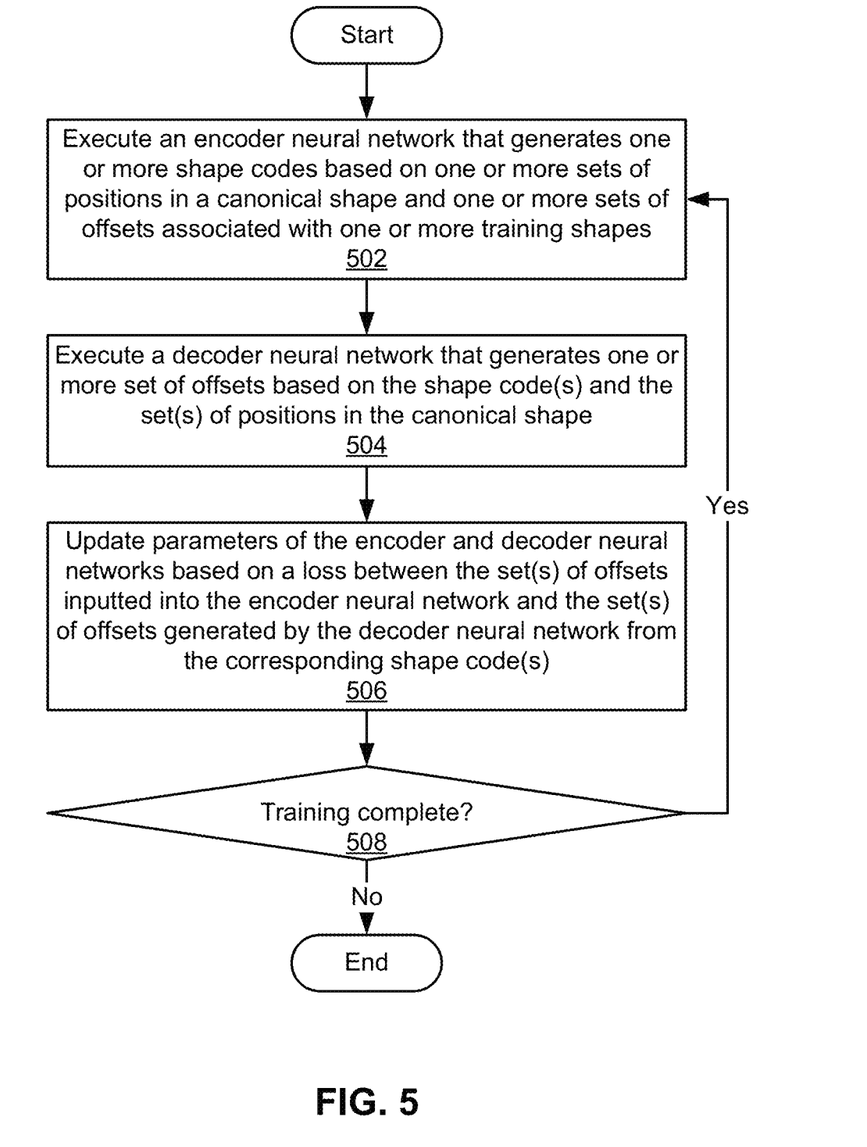
FIG. 5 is a flow diagram of method steps for training a transformer, according to various embodiments.

FIG. 5 is a flow diagram of method steps for training a transformer, according to various embodiments. Although the method steps are described in conjunction with the systems of FIGS. 1-2, persons skilled in the art will understand that any system configured to perform the method steps in any order falls within the scope of the present disclosure.

As shown, in step 502, training engine 122 executes an encoder neural network that generates one or more shape codes based on one or more sets of positions in a canonical shape and one or more sets of offsets associated with one or more training shapes. For example, training engine 122 could obtain a representation of each training shape as a set of positions in the canonical shape and a set of ground truth offsets that are applied to the set of positions to produce the training shape. Training engine 122 could input the positions and ground truth offsets into one or more MLPs in the encoder neural network to produce a set of position tokens and a set of offset tokens. Training engine 122 could also input a shape token and a concatenation of each position token with a corresponding offset token into one or more encoder transformer blocks. Training engine 122 could then obtain the shape code as the output of the encoder transformer block(s).

Next, in step 504, training engine 122 executes a decoder neural network that generates one or more sets of offsets based on the shape code(s) and the set(s) of positions in the canonical shape. For example, training engine 122 could input the same set of positions used by the encoder neural network to generate a shape code for a given training shape into an MLP in the decoder neural network. Training engine 122 could obtain a set of position tokens as output of the MLP and input the position tokens and the shape code into one or more decoder transformer blocks. Training engine 122 could then use another MLP in the decoder neural network to convert output tokens produced by the decoder transformer blocks into a set of offsets associated with an output shape.

In step 506, training engine 122 updates parameters of the encoder and decoder neural networks based on a loss between the set(s) of offsets inputted into the encoder neural network and the set(s) of offsets generated by the decoder neural network from the corresponding shape code(s). For example, training engine 122 could calculate an L2 loss and/or another measure of error between each set of offsets inputted into the encoder neural network and a corresponding set of offsets outputted by the decoder neural network. Training engine 122 could then use gradient descent and backpropagation to update weights in the encoder and decoder neural networks in a way that reduces the loss.

In step 508, training engine 122 determines whether or not training of the transformer is complete. For example, training engine 122 could determine that training is complete when one or more conditions are met. These condition(s) include (but are not limited to) convergence in the parameters of the encoder and decoder neural networks, the lowering of the loss to below a threshold, and/or a certain number of training steps, iterations, batches, and/or epochs. While training of the transformer is not complete, training engine 122 continues performing steps 502, 504, and 506. Training engine 122 then ends the process of training the transformer once the condition(s) are met.

Figure 6:
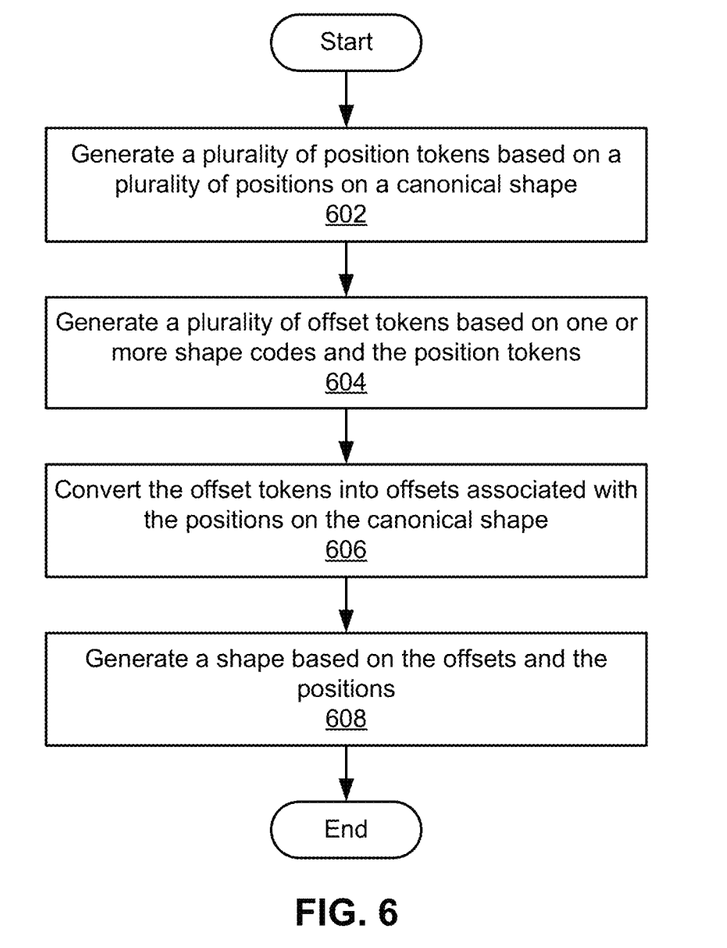
FIG. 6 is a flow diagram of method steps for synthesizing a shape, according to various embodiments.

FIG. 6 is a flow diagram of method steps for synthesizing a shape, according to various embodiments. Although the method steps are described in conjunction with the systems of FIGS. 1-2, persons skilled in the art will understand that any system configured to perform the method steps in any order falls within the scope of the present disclosure.

As shown, in step 602, execution engine 124 generates a plurality of position tokens based on a plurality of positions in a canonical shape. For example, execution engine 124 could input each position in the canonical shape into an MLP and obtain a corresponding position token as output of the MLP.

Next, in step 604, execution engine 124 generates a plurality of offset tokens based on one or more shape codes and the position tokens. For example, execution engine 124 could obtain each shape code as output of an encoder neural network, interpolate between two or more shape codes to generate each shape code, and/or randomly generate each shape code. Execution engine 124 could also process the position tokens and shape code(s) using a series of decoder transformer blocks to produce the offset tokens. At each decoder transformer block, execution engine 124 could modulate each position token and/or a corresponding output token from a previous transformer block using one of the shape codes. Execution engine 124 could then obtain the offset tokens as the output of the last decoder transformer block.

In step 606, execution engine 124 converts the offset tokens into offsets associated with the positions on the canonical shape. For example, execution engine 124 could input each offset token into an MLP and obtain a corresponding offset as output of the MLP.

Finally, in step 608, execution engine 124 generates a shape based on the offsets and the positions. This shape can include (but is not limited to) a face, hand, body, body part, human, animal, plant, and/or another type of deformable shape. For example, execution engine 124 could add each offset obtained in step 606 with a corresponding position on the canonical shape to obtain a different position on the shape. As a result, the shape corresponds to a "deformation" of the canonical shape that reflects a given identity, expression, posture, and/or another distinguishing visual attribute.

In sum, the disclosed techniques use a transformer-based neural network architecture to represent a domain of deformable shapes such as faces, hands, and/or bodies. A canonical shape is used as a template from which various positions can be sampled or defined, and each shape in the domain is represented as a set of offsets from a corresponding set of positions on the canonical shape. An encoder neural network is used to convert a first set of positions in the canonical shape and a corresponding set of offsets for a target shape into a shape code that represents the target shape. A decoder neural network is used to generate an output shape, given the shape code and a second set of positions in the canonical shape. In particular, the decoder network generates a new set of offsets based on tokens that represent the second set of positions and that have been modulated with the shape code. The new set of offsets is then combined with the second set of positions inputted into the decoder network to produce a set of positions in the output shape. The output shape can also be varied by changing the shape code inputted into the decoder neural network, changing the positions inputted into the decoder neural network, using different shape codes to modulate different tokens, and/or using different shape codes at different decoder transformer blocks in the decoder network.

One technical advantage of the disclosed techniques relative to the prior art is the ability to learn both global and location correlations across points on a shape. Accordingly, the disclosed techniques generate more accurate or realistic shapes than conventional approaches that focus on either global or local spatial correlations in modeling shapes. Another technical advantage of the disclosed techniques is that geometric shape detail can be represented in a topology-independent manner with arbitrary spatial resolution. Consequently, the disclosed techniques do not require hand-crafted precomputation of upsampling and downsampling operations to adapt a parametric shape model to different topologies. Further, the disclosed techniques can be used with multiple mesh topologies and resolutions, both during training and shape synthesis. These technical advantages provide one or more technological improvements over prior art approaches.

1. In some embodiments, a computer-implemented method for synthesizing a shape comprises generating a first plurality of offset tokens based on a first shape code and a first plurality of position tokens, wherein the first shape code represents a variation of a canonical shape, and wherein the first plurality of position tokens represent a first plurality of positions on the canonical shape; generating a first plurality of offsets associated with the first plurality of positions on the canonical shape based on the first plurality of offset tokens; and generating the shape based on the first plurality of offsets and the first plurality of positions.

2. The computer-implemented method of clause 1, further comprising executing an encoder neural network that generates a second shape code based on a second plurality of offset tokens associated with a training shape; and updating one or more parameters of the encoder neural network and a decoder neural network, wherein the decoder neural network generates the first plurality of offset tokens, and wherein the one or more parameters are updated based on a loss between a plurality of ground truth offsets associated with the second plurality of offset tokens and a second plurality of offsets outputted by the decoder neural network based on the second shape code.

3. The computer-implemented method of any of clauses 1-2, wherein executing the encoder neural network comprises for each offset token included in the second plurality of offset tokens, inputting a concatenation of the offset token with a corresponding position token into the encoder neural network; and inputting a shape token associated with the second shape code into the encoder neural network.

4. The computer-implemented method of any of clauses 1-3, wherein the first shape code is randomly generated, interpolated between the second shape code and one or more shape codes generated by the encoder neural network based on one or more training shapes, or selected from the one or more training shapes.

5. The computer-implemented method of any of clauses 1-4, wherein the first plurality of offset tokens are generated by one or more neural network layers.

6. The computer-implemented method of any of clauses 1-5, wherein the one or more neural network layers modulate the first plurality of offset tokens based on the first shape code.

7. The computer-implemented method of any of clauses 1-6, wherein the one or more neural network layers comprise a cross-covariance attention layer.

8. The computer-implemented method of any of clauses 1-7, further comprising generating the first shape code based on an identity code that represents an identity associated with the shape and an expression code that represents an expression associated with the shape.

9. The computer-implemented method of any of clauses 1-8, further comprising generating the first plurality of position tokens as a plurality of latent representations of the first plurality of positions on the canonical shape.

10. The computer-implemented method of any of clauses 1-9, wherein the first plurality of offset tokens are converted into the first plurality of offsets via one or more neural network layers.

11. In some embodiments, one or more non-transitory computer readable media store instructions that, when executed by one or more processors, cause the one or more processors to perform the steps of generating a first plurality of offset tokens based on a first shape code and a first plurality of position tokens, wherein the first shape code represents a variation of a canonical shape, and wherein the first plurality of position tokens represent a first plurality of positions on the canonical shape; generating a first plurality of offsets associated with the first plurality of positions on the canonical shape based on the first plurality of offset tokens; and generating a shape based on the first plurality of offsets and the first plurality of positions.

12. The one or more non-transitory computer readable media of clause 11, wherein the instructions further cause the one or more processors to perform the steps of executing an encoder neural network that generates a second shape code based on a second plurality of offset tokens and a second plurality of position tokens associated with a training shape; and updating one or more parameters of the encoder neural network and a decoder neural network, wherein the decoder neural network generates the first plurality of offset tokens, and wherein the one or more parameters are updated based on a loss between a plurality of ground truth offsets associated with the second plurality of offset tokens and a second plurality of offsets outputted by the decoder neural network based on the second shape code.

13. The one or more non-transitory computer readable media of any of clauses 11-12, wherein the encoder neural network comprises a sequence of transformer blocks.

14. The one or more non-transitory computer readable media of any of clauses 11-13, wherein the first shape code is generated by the encoder neural network based on a third plurality of offset tokens and a third plurality of position tokens associated with a first portion of the shape.

15. The one or more non-transitory computer readable media of any of clauses 11-14, wherein the second plurality of position tokens represent a second plurality of positions on the canonical shape, and wherein the second plurality of positions is different from the first plurality of positions.

16. The one or more non-transitory computer readable media of any of clauses 11-15, further comprising iteratively updating the first shape code based on a loss between the shape and a target shape.

17. The one or more non-transitory computer readable media of any of clauses 11-16, wherein generating the first plurality of offset tokens comprises modulating the first plurality of offset tokens based on the first shape code; generating a first plurality of output tokens based on the modulated first plurality of offset tokens; modulating the first plurality of output tokens based on a second shape code that is different from the first shape code; and generating the first plurality of offset tokens based on the modulated first plurality of output tokens.

18. The one or more non-transitory computer readable media of any of clauses 11-17, wherein the instructions further cause the one or more processors to perform the step of sampling the first plurality of positions from a continuous surface representing the canonical shape.

19. The one or more non-transitory computer readable media of any of clauses 11-18, wherein the canonical shape comprises at least one of a face, a hand, or a body.

20. In some embodiments, a system comprises one or more memories that store instructions, and one or more processors that are coupled to the one or more memories and, when executing the instructions, are configured to generate a first plurality of offset tokens based on a first shape code and a first plurality of position tokens, wherein the first shape code represents a variation of a canonical shape, and wherein the first plurality of position tokens represent a first plurality of positions on the canonical shape; generate a first plurality of offsets associated with the first plurality of positions on the canonical shape based on the first plurality of offset tokens; and generate a shape based on the first plurality of offsets and the first plurality of positions.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for synthesizing a shape, the computer-implemented method comprising:
   generating a first plurality of offset tokens represented in a latent space based on a first shape code and a first plurality of position tokens, wherein the first shape code represents a variation of a canonical shape, and wherein the first plurality of position tokens represent a first plurality of positions on the canonical shape;
   generating a first plurality of offsets associated with the first plurality of positions on the canonical shape based on the first plurality of offset tokens; and
   generating the shape based on the first plurality of offsets and the first plurality of positions.

2. The computer-implemented method of claim 1, further comprising:
   executing an encoder neural network that generates a second shape code based on a second plurality of offset tokens associated with a training shape; and
   updating one or more parameters of the encoder neural network and a decoder neural network, wherein the decoder neural network generates the first plurality of offset tokens, and wherein the one or more parameters are updated based on a loss between a plurality of ground truth offsets associated with the second plurality of offset tokens and a second plurality of offsets outputted by the decoder neural network based on the second shape code.

3. The computer-implemented method of claim 2, wherein executing the encoder neural network comprises:
   for each offset token included in the second plurality of offset tokens, inputting a concatenation of the offset token with a corresponding position token into the encoder neural network; and
   inputting a shape token associated with the second shape code into the encoder neural network.

4. The computer-implemented method of claim 2, wherein the first shape code is randomly generated, interpolated between the second shape code and one or more shape codes generated by the encoder neural network based on one or more training shapes, or selected from the one or more training shapes.

5. The computer-implemented method of claim 1, wherein the first plurality of offset tokens are generated by one or more neural network layers.

6. The computer-implemented method of claim 5, wherein the one or more neural network layers modulate the first plurality of offset tokens based on the first shape code.

7. The computer-implemented method of claim 5, wherein the one or more neural network layers comprise a cross-covariance attention layer.

8. The computer-implemented method of claim 1, further comprising generating the first shape code based on an identity code that represents an identity associated with the shape and an expression code that represents an expression associated with the shape.

9. The computer-implemented method of claim 1, further comprising generating the first plurality of position tokens as a plurality of latent representations of the first plurality of positions on the canonical shape.

10. The computer-implemented method of claim 1, wherein the first plurality of offset tokens are converted into the first plurality of offsets via one or more neural network layers.

11. One or more non-transitory computer readable media storing instructions that, when executed by one or more processors, cause the one or more processors to perform the steps of:
    generating a first plurality of offset tokens represented in a latent space based on a first shape code and a first plurality of position tokens, wherein the first shape code represents a variation of a canonical shape, and wherein the first plurality of position tokens represent a first plurality of positions on the canonical shape;
    generating a first plurality of offsets associated with the first plurality of positions on the canonical shape based on the first plurality of offset tokens; and
    generating a shape based on the first plurality of offsets and the first plurality of positions.

12. The one or more non-transitory computer readable media of claim 11, wherein the instructions further cause the one or more processors to perform the steps of:
    executing an encoder neural network that generates a second shape code based on a second plurality of offset tokens and a second plurality of position tokens associated with a training shape; and
    updating one or more parameters of the encoder neural network and a decoder neural network, wherein the decoder neural network generates the first plurality of offset tokens, and wherein the one or more parameters are updated based on a loss between a plurality of ground truth offsets associated with the second plurality of offset tokens and a second plurality of offsets outputted by the decoder neural network based on the second shape code.

13. The one or more non-transitory computer readable media of claim 12, wherein the encoder neural network comprises a sequence of transformer blocks.

14. The one or more non-transitory computer readable media of claim 12, wherein the first shape code is generated by the encoder neural network based on a third plurality of offset tokens and a third plurality of position tokens associated with a first portion of the shape.

15. The one or more non-transitory computer readable media of claim 12, wherein the second plurality of position tokens represent a second plurality of positions on the canonical shape, and wherein the second plurality of positions is different from the first plurality of positions.

16. The one or more non-transitory computer readable media of claim 11, further comprising iteratively updating the first shape code based on a loss between the shape and a target shape.

17. The one or more non-transitory computer readable media of claim 11, wherein generating the first plurality of offset tokens comprises:
    modulating the first plurality of offset tokens based on the first shape code;
    generating a first plurality of output tokens based on the modulated first plurality of offset tokens;
    modulating the first plurality of output tokens based on a second shape code that is different from the first shape code; and
    generating the first plurality of offset tokens based on the modulated first plurality of output tokens.

18. The one or more non-transitory computer readable media of claim 11, wherein the instructions further cause the one or more processors to perform the step of sampling the first plurality of positions from a continuous surface representing the canonical shape.

19. The one or more non-transitory computer readable media of claim 11, wherein the canonical shape comprises at least one of a face, a hand, or a body.

20. A system, comprising:
    one or more memories that store instructions, and
    one or more processors that are coupled to the one or more memories and,
        when executing the instructions, are configured to:
        generate a first plurality of offset tokens represented in a latent space based on a first shape code and a first plurality of position tokens, wherein the first shape code represents a variation of a canonical shape, and wherein the first plurality of position tokens represent a first plurality of positions on the canonical shape;
        generate a first plurality of offsets associated with the first plurality of positions on the canonical shape based on the first plurality of offset tokens; and
        generate a shape based on the first plurality of offsets and the first plurality of positions.

* * * * *